UNITED STATES PATENT OFFICE.

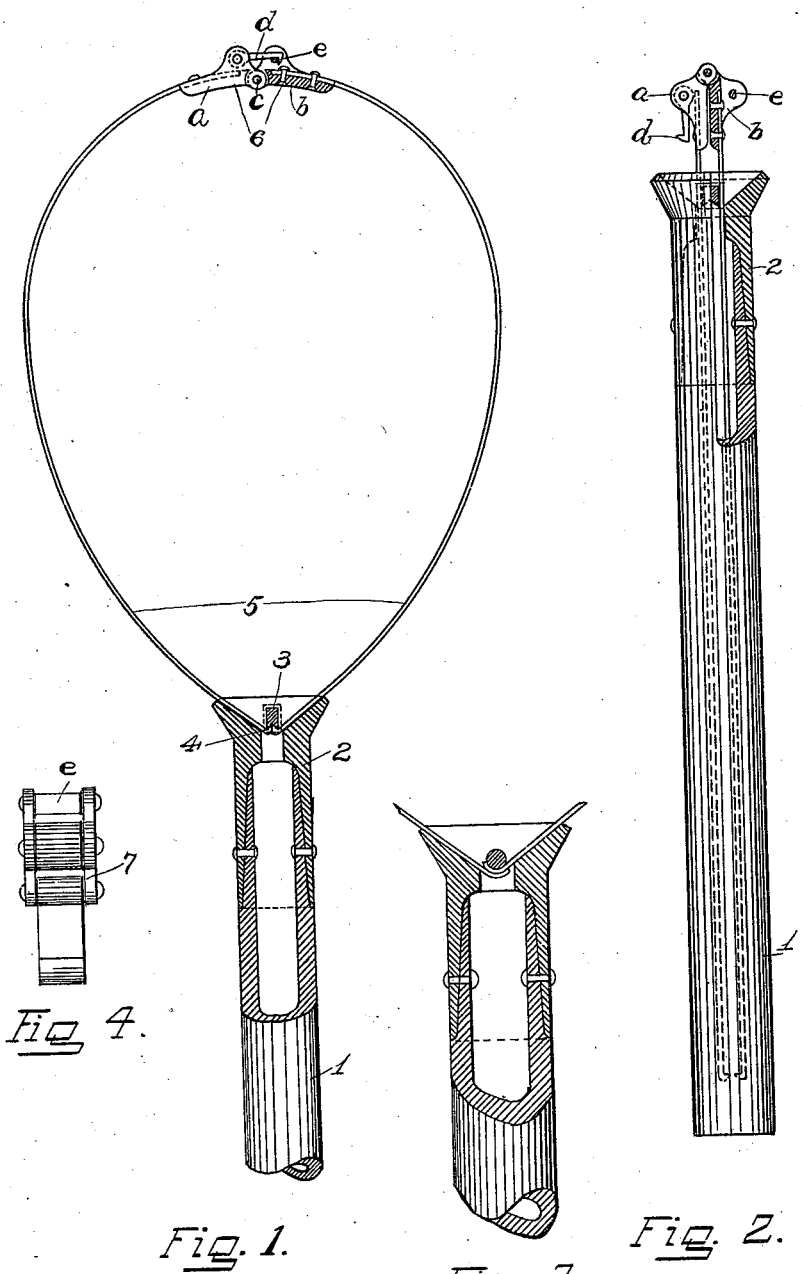

CHARLES G. KEENAN, OF ALLEGHENY, PENNSYLVANIA.

LANDING-NET FRAME.

SPECIFICATION forming part of Letters Patent No. 549,368, dated November 5, 1895.

Application filed April 23, 1895. Serial No. 546,875. (No model.)

*To all whom it may concern:*

Be it known that I, CHARLES G. KEENAN, a citizen of the United States, residing at Allegheny, in the county of Allegheny and State of Pennsylvania, have invented certain new and useful Improvements in Landing-Net Frames; and I do hereby declare the following to be a full, clear, and exact description of the invention, such as will enable others skilled in the art to which it pertains to make and use the same, reference being had to the accompanying drawings, which form a part of this specification, in which—

Figure 1 indicates a longitudinal view of my improved landing-net, the outer portion of the tubular handle and ferrule being in section. Fig. 2 is a similar view of the same, the net-frame being collapsed and pushed into the handle. Fig. 3 is a transverse section of the outer portion of the handle and ferrule, showing a modified form of securing the inner ends of the flexible strips. Fig. 4 is a plan view of hinge.

My invention relates to landing-nets, my object being to simplify the construction and to increase the portability and strength of the same, and to this purpose consists of the novel construction and arrangement of parts hereinafter specifically described.

Referring to the drawings accompanying and made part hereof, 1 is a hollow tubular handle, the outer or upper end of which is provided with a ferrule 2, bolted, screwed, or otherwise suitably secured thereon. The outer end of said ferrule is greater in cross-section than the handle to which it is attached, the inner sides of the same being flared or diverging, as shown. The cross piece or bar 3 is secured in the lower flared portion of said ferrule and is provided with a V-shaped groove 4 when said bar is square or oblong in cross-section to receive the bent inner ends of the net-frame 5, which is formed of two flexible metallic strips, the outer ends of which are adapted to be fastened or locked by the catch 6. Said catch 6 is formed of parts $a$ and $b$, pivotally secured at $c$, the parts $a$ and $b$, respectively, being bolted or otherwise suitably secured to the ends of the flexible strips. The part $a$ carries a hook $d$, part $b$ carrying the bar $e$, whereon the hook $d$ is adapted to engage, and thus fasten or lock the flexible strips forming the net-frame when the same is drawn into oviform, as shown in Fig. 1.

In Fig. 3 I show a modification of my device in which the cross-bar 3 is circular in cross-section in the inner ends of the flexible strips forming the net lapping around the same, as shown, the distention of the spring-strips being sufficient to maintain said net-frame in the form shown in Fig. 1, the diverging sides of the mouth of the ferrule permitting this. In order to collapse said frame, the lock is released and the strips swing on the pivot $c$ into almost parallel position, when they may be readily pushed into the handle.

Having described my invention, what I claim, and desire to secure by Letters Patent, is—

A landing net frame having a hollow tubular handle provided with a ferrule suitably secured on the outer end thereof having a flared mouth with diverging sides and a cross bar extending across the bottom of the same and secured in the sides thereof; a net frame consisting of two flexible strips, the inner ends being bent or curved to engage upon said cross bar when said strips are drawn out from the handle, and a locking catch adapted to connect the outer ends of said metallic strips, substantially as described.

In testimony that I claim the foregoing I hereunto affix my signature this 15th day of April, A. D. 1895.

CHARLES G. KEENAN. [L. S.]

In presence of—
JAS. J. MCAFEE,
C. A. WILLIAMS.